United States Patent
Kini et al.

(10) Patent No.: US 10,442,419 B2
(45) Date of Patent: Oct. 15, 2019

(54) BRAKE RETARDER VALVE

(71) Applicant: Deere & Company, Moline, IL (US)

(72) Inventors: Prashantha Kini, Shiriyara (IN); Rajgopal Raibagi, Dharwad (IN); Ravi Ranjan Thakur, Renukoot (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/585,274

(22) Filed: May 3, 2017

(65) Prior Publication Data

US 2018/0111595 A1     Apr. 26, 2018

(30) Foreign Application Priority Data

Oct. 26, 2016   (IN) .............................. 201621036651

(51) Int. Cl.
*B60T 15/46* (2006.01)
*B60T 7/20* (2006.01)
*B60T 11/10* (2006.01)
*B60T 11/34* (2006.01)
*B60T 15/22* (2006.01)

(52) U.S. Cl.
CPC ................ *B60T 15/46* (2013.01); *B60T 7/20* (2013.01); *B60T 11/108* (2013.01); *B60T 11/34* (2013.01); *B60T 15/223* (2013.01)

(58) Field of Classification Search
CPC .......... B60T 15/46; B60T 15/36; B60T 13/22; B60T 13/141; B60T 8/323; B60T 8/26; B60T 8/262; B60T 8/265; B60T 11/108; B60T 11/34; Y10T 137/2605
USPC ...................................... 188/349; 137/115.13
See application file for complete search history.

(56) References Cited

U.S. PATENT DOCUMENTS

| | | | |
|---|---|---|---|
| 2,985,489 A * | 5/1961 | Stelzer | B60T 13/403 303/15 |
| 3,170,543 A | 2/1965 | Cook et al. | |
| 3,394,546 A * | 7/1968 | Stelzer | B60T 8/26 303/9.74 |

(Continued)

FOREIGN PATENT DOCUMENTS

| | | | |
|---|---|---|---|
| DE | 671251 C | 2/1939 | |
| DE | 3814436 A * | 1/1989 | B60T 11/18 |

(Continued)

OTHER PUBLICATIONS

European Search Report issued in counterpart application No. 17198266.3 dated Apr. 26, 2018. (7 pages).

(Continued)

*Primary Examiner* — Bradley T King
*Assistant Examiner* — Stephen M Bowes

(57) ABSTRACT

A brake retarder valve for a tractor-trailer combination includes a valve housing and a valve assembly. The valve assembly includes a poppet valve biased by a spring and a gravity spool. The valve assembly is selectively operable between the operative closed configuration and an open configuration in response to a resultant of the fluid pressure between a trailer axle brake and a tractor axle brake. The tractor axle brake is actuated with a time delay from actuation of the trailer axle brake. This delay is actuation of the tractor axle brake prevents jack knifing of the trailer onto the tractor in a tractor-trailer combination, thereby ensuring safety during operation of a tractor-trailer combination.

20 Claims, 4 Drawing Sheets

(56) References Cited

U.S. PATENT DOCUMENTS

| | | | | |
|---|---|---|---|---|
| 3,453,029 A | * | 7/1969 | Swanson | B60T 11/34 |
| | | | | 137/493.1 |
| 3,526,438 A | * | 9/1970 | England | B60T 7/20 |
| | | | | 188/112 R |
| 3,543,512 A | | 12/1970 | England et al. | |
| 3,843,206 A | * | 10/1974 | Teagle | B60T 7/20 |
| | | | | 137/115.13 |
| 4,132,241 A | | 1/1979 | Iannelli | |

FOREIGN PATENT DOCUMENTS

| | | | | |
|---|---|---|---|---|
| FR | 1243130 A | * | 10/1960 | B60T 15/46 |
| FR | 1298826 A | * | 7/1962 | B60T 13/58 |
| FR | 2387395 A1 | | 11/1978 | |
| GB | 493330 A | * | 10/1938 | B60T 13/36 |
| GB | 2069645 A | | 8/1981 | |
| GB | 2153468 A | | 8/1985 | |

OTHER PUBLICATIONS

European Search Report issued in counterpart application No. 17198266.3 dated Apr. 12, 2019. (6 pages).

\* cited by examiner

BRAKE RETARDER VALVE

RELATED APPLICATIONS

This application claims the benefit of Indian Application Ser. No. 201621036651, filed on Oct. 26, 2016, the disclosure of which is hereby expressly incorporated by reference in its entirety.

FIELD OF THE DISCLOSURE

The present disclosure relates to the field of valve for retarding flow of fluid for braking a tractor in a tractor trailer combination.

BACKGROUND

Trailers play an important role in the transportation of goods. However, proper control of trailers is necessary for their safe and economical operation, both on and off the highway. In a combination of a traction vehicle, such as a tractor, towing a trailer, the tractor axle and the trailer axle are provided with discrete brakes. However, both the brakes are operated by pressurized fluid supplied from a common source. While traversing, it is necessary to ensure care that the tractor brakes are not applied first nor more forcibly than the trailer brakes. This is to prevent the inertia of the trailer does not tend to cause it to overtake the tractor which may result in jack knifing or skidding the tractor wheels with a consequent loss of directional control.

Hence, there is felt a need for an arrangement to obviate the aforementioned problems and provide safe operation in a combination of a traction vehicle towing a trailer.

SUMMARY

In one embodiment of the present disclosure, a brake retarder valve is provided for a tractor-trailer combination. A fluid line is provided to sequentially supply pressurized fluid to a trailer axle brake and a tractor axle brake respectively. The brake retarder valve is associated with the tractor axle brake. The brake retarder valve includes a housing and a spring biased valve assembly.

The housing defines a valve chamber having an open end and a closed end. The housing defines a housing fluid inlet and at least one housing fluid outlet. The housing fluid outlets is orthogonal to the housing fluid inlets. A valve seat defined in the housing within the valve chamber.

The valve assembly is biased against the valve seat in an operative closed configuration to selectively restrict flow passage from housing fluid inlet to at least one housing fluid outlet. The valve assembly is selectively operable between the operative closed configuration and an open configuration for flow of fluid between the fluid line and said tractor axle brake. The valve assembly is selectively operable in response to a resultant of the fluid pressure between the trailer axle brake and a tractor axle brake. An orifice is formed between associated members of the valve assembly in the operative closed configuration.

The associated members include a spring loaded poppet valve and a self-weight plug. The self-weight plug is configured to restrict fluid flow through the poppet valve in the operative closed configuration. The poppet valve is formed by a cylindrical wall defining an axial space and an annular valve head on one end thereof. The poppet valve defines at least one valve fluid inlet along the cylindrical wall and an axial fluid outlet formed at the valve head.

The self-weight plug is defined by an elongated stem and a shoulder. The self-weight plug is restrictively displaceable with respect to the poppet valve switch the valve assembly from the operative closed configuration to the open configuration.

A slot is engraved on the cylindrical wall proximate the valve head and extending from the valve head into the axial space. The slot is configured to define the orifice between the self-weight plug and the poppet valve.

The poppet valve has at least one valve fluid inlet along the cylindrical wall and an axial fluid outlet. The at least one valve fluid inlet are orthogonal to an axial fluid outlet. The housing fluid inlet and the axial fluid outlet are substantially co-axial.

The valve assembly is operable to be axially displaced within the valve chamber to the closed end of the housing in a tractor brake engaging condition.

The valve assembly is operable to be axially displaced within the valve chamber to the closed end of the housing in the tractor brake engaging condition.

The valve assembly is in the operative closed condition in a tractor-trailer braked condition. The tractor-trailer braked condition is achieved after trailer axle brake and the tractor axle brake are fully engaged. The orifice is configured to equalize fluid pressure in the trailer axle brake and the tractor axle brake.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

The embodiments herein and the various features and advantageous details thereof are explained with reference to the non-limiting embodiments in the following description. Descriptions of well-known components and processing techniques are omitted so as to not unnecessarily obscure the embodiments herein.

DETAILED DESCRIPTION

In the present disclosure, a retarder brake valve is provided for retarding a flow of braking fluid, helps in synchronization braking of a tractor-trailer combination, is simple and compact in construction, a self-cleaning valve, is safe operation of a tractor trailer combination during braking, and minimizes air entrapment.

Figure 1:
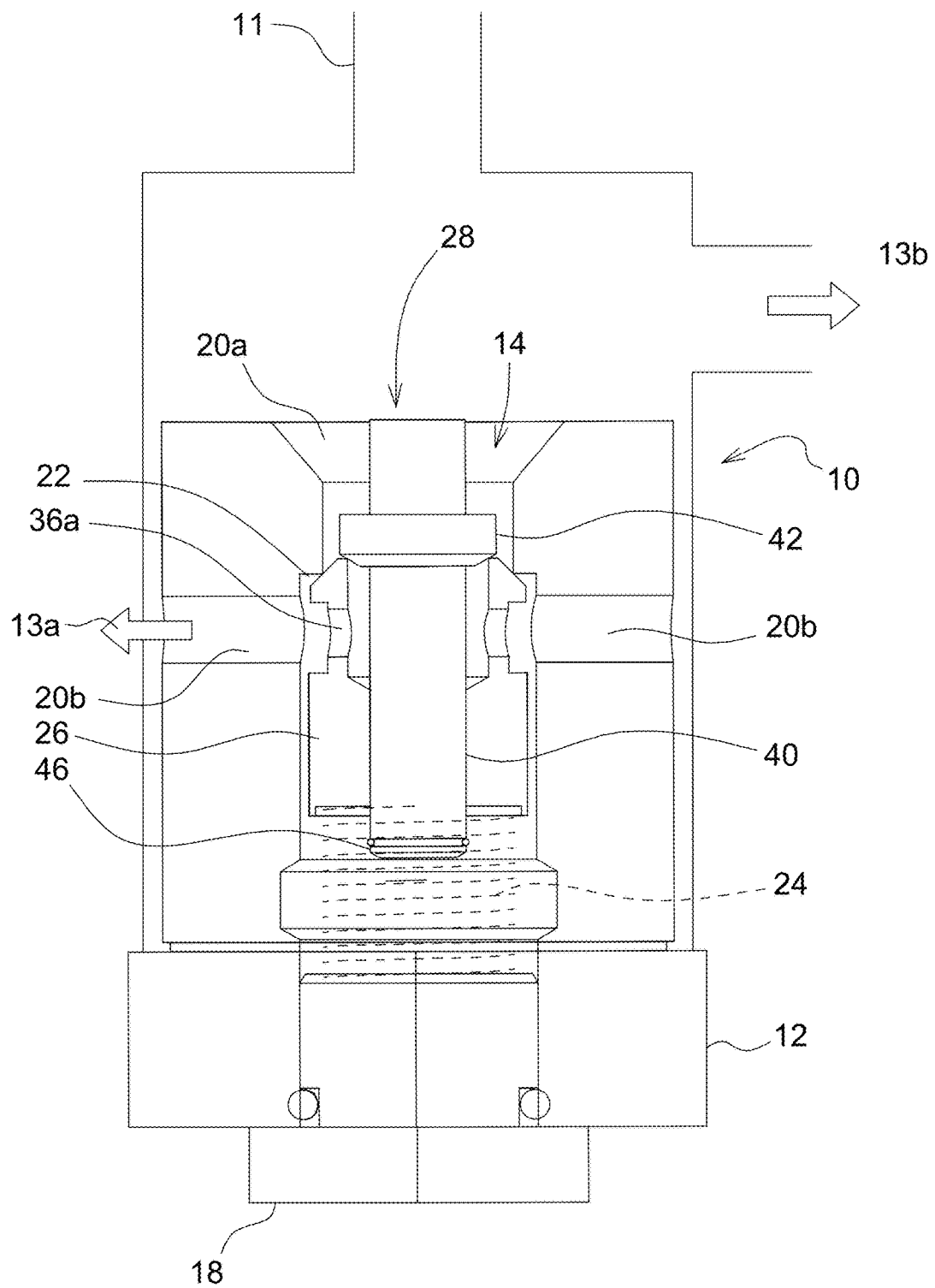
FIG. 1 is a sectional view of a brake retarder valve in a fluid line.

In FIG. 1, a brake retarder valve is shown disposed within a fluid line. The brake retarder valve is generally referenced by the numeral 10.

The brake retarder valve 10 will henceforth be described with reference to FIGS. 1-5, unless specifically referred. The brake retarder valve 10 includes a valve housing 12 and a valve assembly. The brake retarder valve 10 communicates the fluid line 11, carrying pressurized fluid at a required pressure, from a brake valve and a tractor axle brake 13a.

Figure 2:
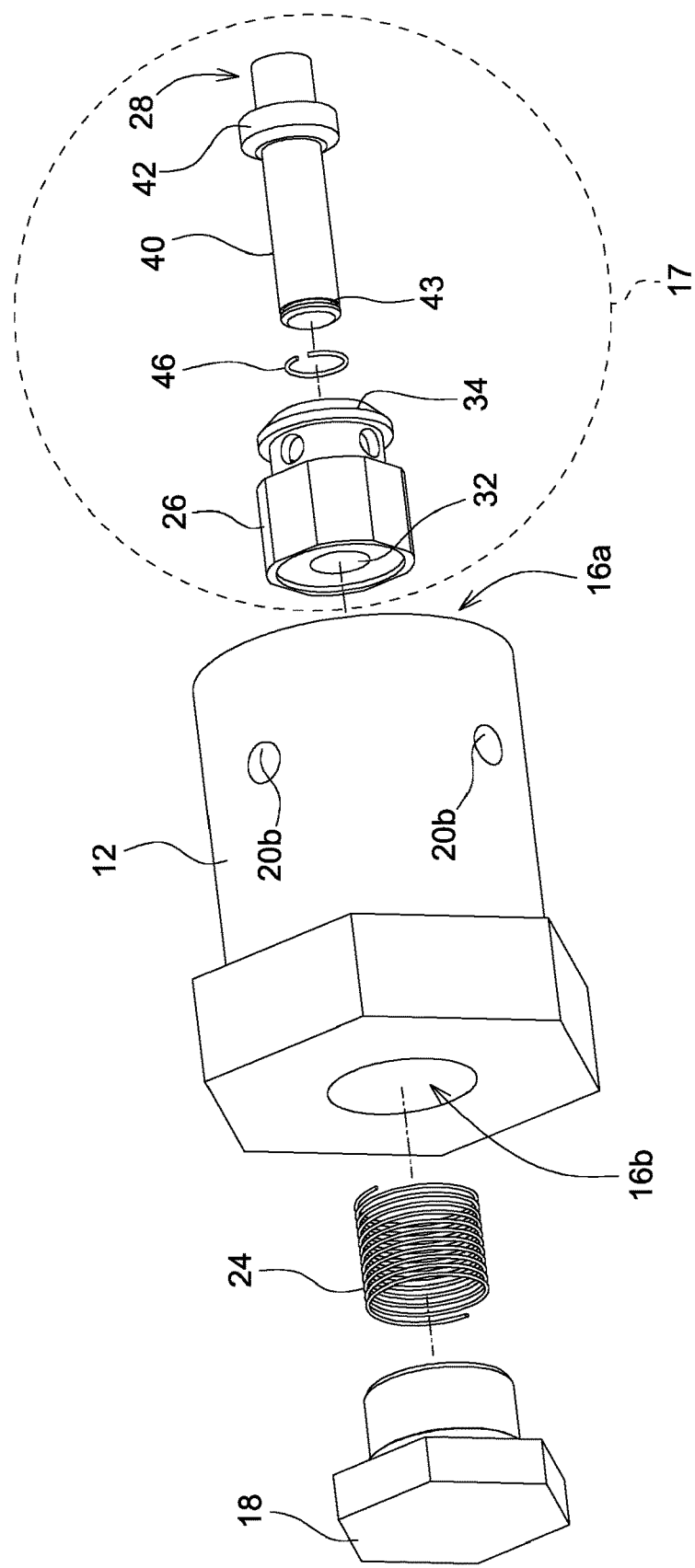
FIG. 2 is an exploded view of the brake retarder valve of FIG. 1 with a valve housing, a poppet valve and a gravity spool.

The housing 12 defines a valve chamber 14 for accommodating the valve assembly. The valve chamber 14 has an open end 16a while the end distal from the open end 16a defines a closed end 16b. The closed end 16b of the valve chamber 14 is formed by an end plug 18. The end plug 18 may be removably fitted to the housing 12, as illustrated in FIG. 1 and FIG. 2, or may be integrally formed. The open end 16a defines a housing fluid inlet 20a which is co-axial with the valve chamber 14. The housing 12 has at least one housing fluid outlet 20b. The housing fluid outlets 20b being orthogonal to the housing fluid inlet end 20a. A valve seat 22 is defined in the housing 12 within the valve chamber 14. The valve seat 22 is defined between the housing fluid inlet end 20a and the housing fluid outlets 20b.

A valve assembly is positioned within the valve chamber 14 of the housing 12. The valve assembly is biased by a spring 24 against the valve seat 22, thereby closing flow of fluid from the housing fluid inlet end 20a to the housing fluid outlets 20b. The spring 24 has a predefined spring force x (not shown).

Figure 3:
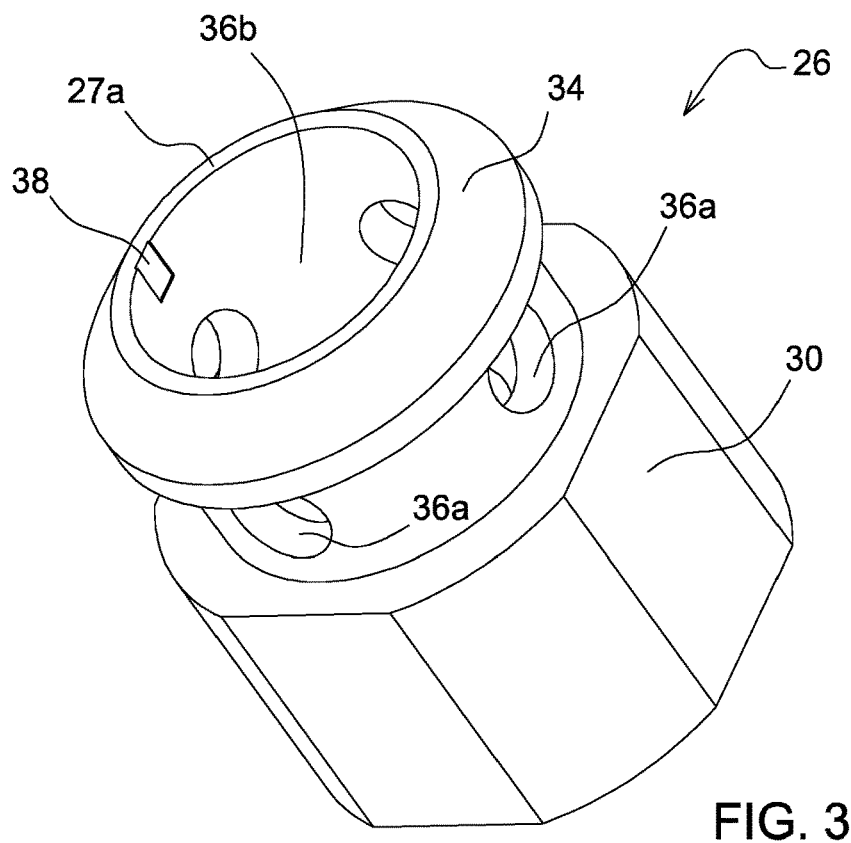
FIG. 3 is a perspective view of a poppet valve.
Figure 4:
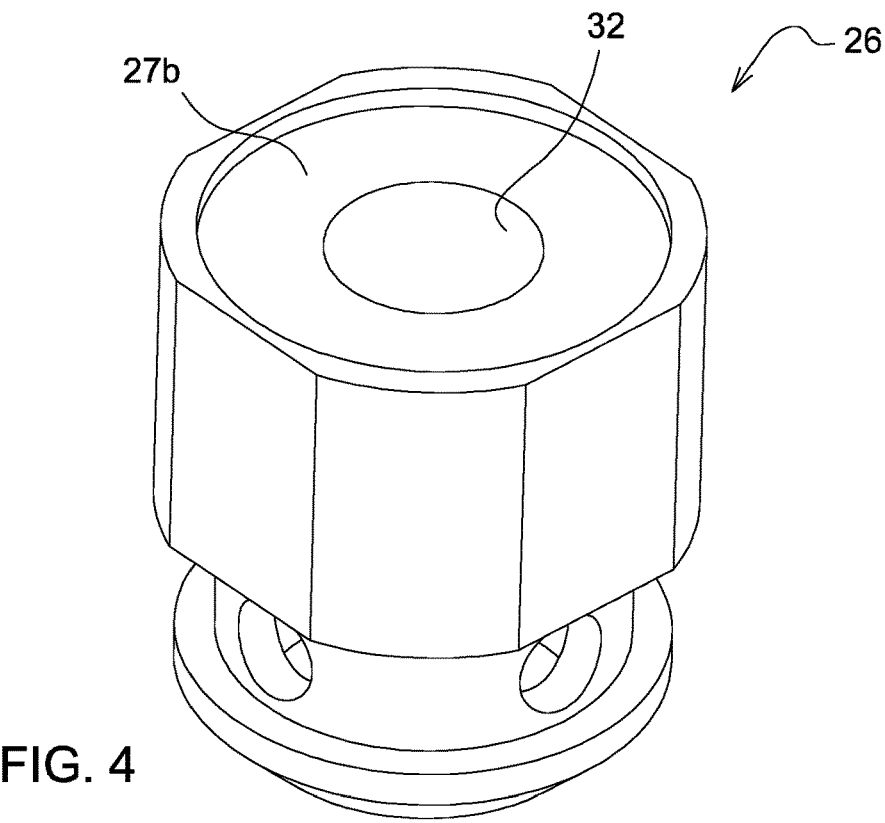
FIG. 4 is a perspective view of an alternate embodiment of the poppet valve of FIG. 3.

The valve assembly includes a poppet valve 26 and a gravity spool 28. The poppet valve 26, particularly illustrated in FIG. 3 and FIG. 4, is a cylindrical structure having a wall 30 defining an axial passage 32 having an open end 27a and a partially closed end 27b. The poppet valve 26 has a valve head 34 defined at the open end of the axial passage 32. The valve head 34 has an annular beveled head profile. The valve head 34 is biased against the valve seat 22 by the spring 24. The poppet valve 26 has at least one valve fluid inlet 36a defined along the circumference of the wall 30 and a valve axial fluid outlet 36b formed at end of the poppet valve 26 having the valve head 34. The spring 24 is disposed between the partially closed end of the poppet valve 26 and the end plug 18.

A slot 38 is engraved on the poppet valve 26, within the axial passage 32, proximate to the end having the valve head 34. The slot 38 extends from the tip of the valve head 34 into said axial passage 32.

The gravity spool 28 has an elongated stem 40 with a shoulder 42 formed at one end. The gravity spool 28 has a predefined weight y (not shown). The gravity spool 28 is disposed within the axial passage 32 of the poppet valve 26, such that, the shoulder 42 of the gravity spool 28 is configured to normally rest on the valve head 34 due to gravity so that the valve axial fluid outlet 36b is in operative closed configuration. In the operative closed configuration, the slot 38 forms an orifice between the gravity spool 28 and the valve head 34. The length of the gravity spool 28 is more than the length of the poppet valve 26. The elongated stem 40, at the end distal from the shoulder 42, includes a circular groove 43 for holding a restrictor element. The restrictor element is a circlip 46. The gravity spool 28 is axially displaceable within the axial passage 32 for opening the valve axial fluid outlet 36b, thereby switching the valve assembly from operative closed configuration to an open configuration. The axial displacement of the gravity spool 28 is restricted by the circlip 46 on contacting the cylindrical structure of the poppet valve 26 at the partially closed end of the poppet valve 26.

The valve assembly is selectively operable to fluidly communicate the pressurized fluid between the tractor axle brake 13a and the fluid line 11. The valve assembly is operable between a tractor brake engaging condition, a tractor-trailer braked condition and a tractor brake disengaging condition.

Figure 5:
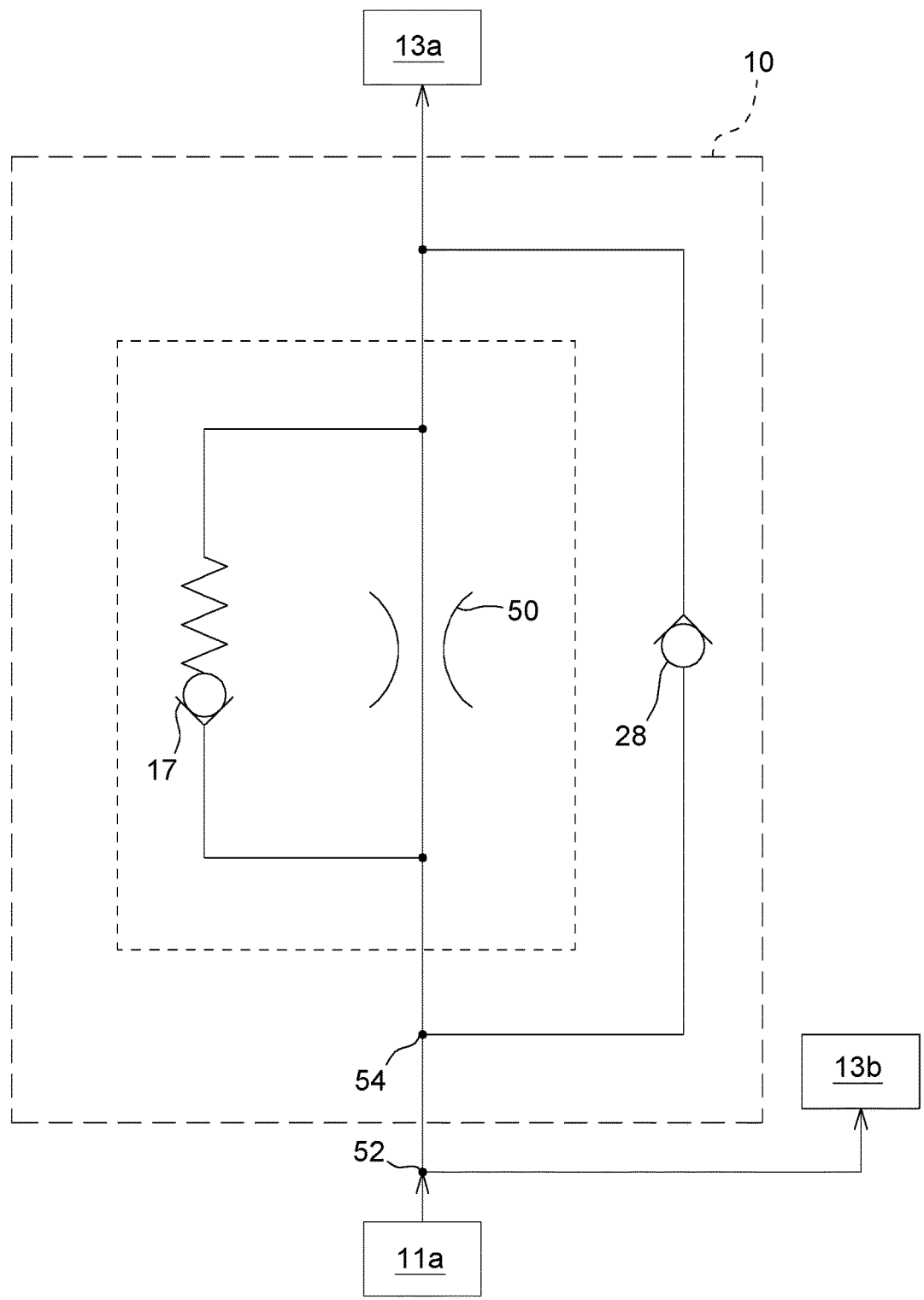
FIG. 5 is a hydraulic schematic for operating a tractor-trailer combination using the brake retarder valve.

Referring to FIG. 1 and FIG. 5, when operator of the tractor-trailer combination operates the brake pedal, pressurized fluid is caused to flow from a brake valve 11a through the fluid line 11 fluidly communicating with the tractor axle brake 13a and a trailer axle brake 13b. The fluid line 11 has a first port 52 and a second port 54 for supplying the pressurized fluid to a trailer axle brake 13b and a tractor axle brake 13a respectively. The second port 54 is downstream of the first port 52. The brake retarder valve 10 is configured at the second port 54. Thus, on one hand, the pressurized fluid directly flows into the trailer axle brake 13b for actuation of the same, however, on the other hand, the pressurized fluid is caused to flow to the tractor axle brake 13a though the brake retarder valve 10. Due to free flow of the pressurized fluid to the trailer axle brake 13b, the trailer axle brake 13b is actuated first. Meanwhile, in order for the pressurized fluid to flow to the tractor axle brake 13a for actuation thereof, the pressurized fluid is required to overcome the predefined spring force x of the spring 24. At this stage, the valve assembly 17 is in the operative closed configuration. On overcoming the predefined spring force x of the spring 24, the valve assembly 17 moved from the valve seat 22 and is axially displaced within the valve chamber 14 towards the end plug 18. The displacement of the valve assembly 17 from the valve seat 22 opens the passageway for flow of the pressurized fluid from the housing fluid inlet end 20a to the housing fluid outlets 20b. Thereafter, the pressurized fluid flows from the housing fluid outlets 20b to the tractor axle brake 13a, thereby engaging the tractor axle brake 13a. This is the tractor brake engaging condition. Thus, there is a time delay between the engagement of the trailer axle brake 13b and the tractor axle brake 13a. This prevents the trailer from jack knifing into the tractor in a tractor-trailer combination.

When both the trailer axle brake 13b and the tractor axle brake 13a are actuated the tractor trailer combination is halted. In the halt condition, the pressure of the pressurized fluid is equal on the trailer axle brake 13b and the tractor axle brake 13a. This causes the valve assembly 17 to shift to the operative closed configuration and the valve assembly 17 is biased by the spring against the valve seat 22. The halt condition of the tractor trailer combination is continued till the brake pedal is continued to be depressed. This is the tractor-trailer braked condition. In this condition, the orifice 50 formed by the slot 38 between the poppet valve 26 and the gravity spool 28 helps maintaining fluid communication between the trailer axle brake 13b and the tractor axle brake 13a for maintaining equalized pressure therebetween. The orifice 50 helps in communicating and maintaining equalized pressure between the housing fluid inlet end 20a and the tractor axle brake 13a through the axial passage 32 via the housing fluid outlets 20b and the valve fluid inlets 36a.

When the operator releases the brake pedal, the tractor-trailer braked condition is terminated and the tractor brake disengaging condition is initiated. The initiation of the tractor brake disengaging condition starts by disengagement of the trailer axle brake 13b whereby the pressurized fluid flows out from the trailer axle brake 13b and through the fluid line flows into a sump. This creates a low pressure z (not shown) at the housing fluid inlet end 20a while the pressure in the tractor axle brake 13a is at the pressure y of the pressurized fluid. This difference in pressure between the pressure y of the pressurized fluid in tractor axle brake 13a and the low pressure z (not shown) created at the housing fluid inlet end 20a is communicated by the orifice 50. This difference in pressure causes the pressurized fluid in the tractor axle brake 13a to overcome the weight y of the gravity spool 28. This causes the gravity spool 28 to be axially displaced to switch the valve assembly 17 from the operative closed configuration to the open configuration. This axial displacement is allowed till the circlip 46 contacts the partially closed end of the poppet valve 26. This restricted axial displacement causes the shoulder 42 of the gravity spool 28 to be lifted from the valve head 34, thereby opening the valve fluid outlet 36b for flow of fluid from the tractor axle brake 13a to the fluid line through the valve fluid inlets 36a. This is the tractor brake disengaging condition of the brake retarder valve 10. The flow of the pressurized fluid through the orifice 50 causes self-cleaning of the orifice 50 of any particles which may get trapped in the slot 38 during continuous operation of the brake retarder valve 10.

Once the pressurized fluid flows out of the tractor axle brake 13a, the tractor axle brake 13a is disengaged. As the pressure in the tractor axle brake 13a drops below the pressure required to maintain the gravity spool 28 in lifted condition from the valve head 34, the gravity spool 28, on account of gravity, is axially displaced so that the valve assembly 17 is shifted to the operative closed configuration.

Thus, the delay in causing braking of the trailer axle brake 13b and the tractor axle brake 13a in a tractor-trailer combination provides safety from jack knifing, thereby increasing safe operation of the tractor trailer-combination.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A brake retarder valve for a tractor-trailer combination with a fluid line sequentially supplying pressurized fluid to a trailer axle brake and a tractor axle brake, said brake retarder valve being associated with said tractor axle brake, said brake retarder valve comprising:
   a housing defining a valve chamber having an open end and a closed end, said housing defining a housing fluid inlet and at least one housing fluid outlet, said at least one housing fluid outlet being orthogonal to said housing fluid inlet end;
   a valve seat defined in said housing; and
   a valve assembly that is selectively operable between an open configuration and a closed configuration;
   wherein in said open configuration, said valve assembly is spaced apart from said valve seat and a pathway is defined therebetween, such that a flow of a fluid goes from said fluid line, through said pathway, and to said tractor axle brake;
   wherein in said closed configuration, said valve assembly is biased against said valve seat and a sealed connection is defined therebetween, such that said flow of said fluid goes from said fluid line, through an orifice defined by members of said valve assembly so as to bypass said sealed connection, and to said tractor axle brake;
   wherein said members include a spring loaded poppet valve and a gravity spool; and
   wherein said poppet valve is formed by a wall defining an axial passage and an annular valve head on one end thereof, said poppet valve defining at least one valve fluid inlet along the wall and an axial fluid outlet formed at said valve head.

2. The brake retarder valve of claim 1, wherein said gravity spool is configured to restrict fluid flow through said poppet valve in said closed configuration.

3. The brake retarder valve of claim 1, wherein said valve assembly is operable to be axially displaced within said valve chamber to said closed end of said housing in a tractor brake engaging condition.

4. The brake retarder valve of claim 1, wherein said valve assembly is in said operative closed condition in a tractor-trailer braked condition, said tractor-trailer braked condition being achieved after trailer axle brake and the tractor axle brake are fully engaged, said orifice being configured to equalize fluid pressure in said trailer axle brake and the tractor axle brake.

5. The brake retarder valve of claim 1, wherein a slot is formed into a wall proximate a valve head and extending from said valve head into an axial passage, said slot being configured to define said orifice between said gravity spool and said poppet valve.

6. The brake retarder valve of claim 1, wherein said poppet valve has at least one valve fluid inlet along a wall and an axial valve fluid outlet.

7. The brake retarder valve of claim 1, wherein said at least one valve fluid inlet being orthogonal to said axial valve fluid outlet, said housing fluid inlet and said axial valve fluid outlet being substantially co-axial.

8. A brake retarder valve for a tractor-trailer combination with a fluid line sequentially supplying pressurized fluid to a trailer axle brake and a tractor axle brake, said brake retarder valve being associated with said tractor axle brake, said brake retarder valve comprising:
   a housing defining a valve chamber having an open end and a closed end, said housing defining a housing fluid inlet and at least one housing fluid outlet, said at least one housing fluid outlet being orthogonal to said housing fluid inlet end;
   a valve seat defined in said housing; and
   a valve assembly that is selectively operable between an open configuration and a closed configuration;
   wherein in said open configuration, said valve assembly is spaced apart from said valve seat and a pathway is defined therebetween, such that a flow of a fluid goes from said fluid line, through said pathway, and to said tractor axle brake;
   wherein in said closed configuration, said valve assembly is biased against said valve seat and a sealed connection is defined therebetween, such that said flow of said fluid goes from said fluid line, through an orifice defined by members of said valve assembly so as to bypass said sealed connection, and to said tractor axle brake;
   wherein said members include a spring loaded poppet valve and a gravity spool; and
   wherein a slot is formed into a wall proximate a valve head and extending from said valve head into an axial passage, said slot being configured to define said orifice between said gravity spool and said poppet valve.

9. The brake retarder valve of claim 8, wherein said gravity spool is configured to restrict fluid flow through said poppet valve in said closed configuration.

10. The brake retarder valve of claim 8, wherein said poppet valve is formed by a wall defining an axial passage and an annular valve head on one end thereof, said poppet valve defining at least one valve fluid inlet along the wall and an axial fluid outlet formed at said valve head.

11. The brake retarder valve of claim 8, wherein said poppet valve has at least one valve fluid inlet along a wall and an axial valve fluid outlet.

12. The brake retarder valve of claim 8, wherein said at least one valve fluid inlet being orthogonal to said axial valve fluid outlet, said housing fluid inlet and said axial valve fluid outlet being substantially co-axial.

13. The brake retarder valve of claim 8, wherein said valve assembly is operable to be axially displaced within said valve chamber to said closed end of said housing in a tractor brake engaging condition.

14. The brake retarder valve of claim 8, wherein said valve assembly is in said operative closed condition in a tractor-trailer braked condition, said tractor-trailer braked condition being achieved after trailer axle brake and the tractor axle brake are fully engaged, said orifice being configured to equalize fluid pressure in said trailer axle brake and the tractor axle brake.

15. A brake retarder valve for a tractor-trailer combination with a fluid line sequentially supplying pressurized fluid to a trailer axle brake and a tractor axle brake, said brake retarder valve being associated with said tractor axle brake, said brake retarder valve comprising:
 a housing defining a valve chamber having an open end and a closed end, said housing defining a housing fluid inlet and at least one housing fluid outlet, said at least one housing fluid outlet being orthogonal to said housing fluid inlet end;
 a valve seat defined in said housing; and
 a valve assembly that is selectively operable between an open configuration and a closed configuration;
 wherein in said open configuration, said valve assembly is spaced apart from said valve seat and a pathway is defined therebetween, such that a flow of a fluid goes from said fluid line, through said pathway, and to said tractor axle brake;
 wherein in said closed configuration, said valve assembly is biased against said valve seat and a sealed connection is defined therebetween, such that said flow of said fluid goes from said fluid line, through an orifice defined by members of said valve assembly so as to bypass said sealed connection, and to said tractor axle brake;
 wherein said members include a spring loaded poppet valve and a gravity spool;
 wherein said poppet valve has at least one valve fluid inlet along a wall and an axial valve fluid outlet; and
 wherein said at least one valve fluid inlet being orthogonal to said axial valve fluid outlet, said housing fluid inlet and said axial valve fluid outlet being substantially co-axial.

16. The brake retarder valve of claim 15, wherein said gravity spool is configured to restrict fluid flow through said poppet valve in said closed configuration.

17. The brake retarder valve of claim 15, wherein said poppet valve is formed by a wall defining an axial passage and an annular valve head on one end thereof, said poppet valve defining at least one valve fluid inlet along the wall and an axial fluid outlet formed at said valve head.

18. The brake retarder valve of claim 15, wherein a slot is formed into a wall proximate a valve head and extending from said valve head into an axial passage, said slot being configured to define said orifice between said gravity spool and said poppet valve.

19. The brake retarder valve of claim 15, wherein said valve assembly is operable to be axially displaced within said valve chamber to said closed end of said housing in a tractor brake engaging condition.

20. The brake retarder valve of claim 15, wherein said valve assembly is in said operative closed condition in a tractor-trailer braked condition, said tractor-trailer braked condition being achieved after trailer axle brake and the tractor axle brake are fully engaged, said orifice being configured to equalize fluid pressure in said trailer axle brake and the tractor axle brake.

* * * * *